Nov. 26, 1963   T. J. DAVIES   3,112,165

METAL FABRICATION

Filed Nov. 27, 1959

INVENTOR

THOMAS JAMES DAVIES

BY

3,112,165
METAL FABRICATION
Thomas James Davies, Rotherham, England, assignor to United Kingdom Atomic Energy Authority, London, England
Filed Nov. 27, 1959, Ser. No. 855,677
Claims priority, application Great Britain Nov. 28, 1958
6 Claims. (Cl. 18—59.2)

This invention relates to the manufacture of hollow bodies such as tubes from powder.

Solid bodies can be produced from powder by a method known as loose sintering in which a mold is filled with loosely packed powder and the powder is sintered in the mold no external pressure being applied to the powder in the mold before or during sintering. Considerable shrinkage occurs during the sintering process and the shape of the resulting body is determined by the shape of the mold cavity.

The method has been applied to the manufacture of solid bars and as an extension of the method it would seem feasible, to produce hollow bodies such as tubes by sintering of the powder about a core defining the bore of the tube. However it is found that the shrinkage which occurs during the sintering step gives rise to cracking in the sintered tube.

It is an object of the invention to provide a method of loose sintering powder to form hollow bodies in which the likelihood of cracking during sintering and cooling is reduced.

According to the invention a method for producing a hollow body from powder comprises loose sintering said powder about a supporting core in a mold, said core being of readily contractable form to accommodate for sintering shrinkage.

The core can be made of wire gauze. For a tubular body the core is made in the form of sleeve of wire gauze which can have a diamond weave so as to contract radially without deformation of the strands of the gauze. Such a sleeve can be end loaded to provide a regulated support for the tubular body during sintering, the sleeve still being capable of contraction. Alternatively the sleeve can be made of gauze having a square weave and collapsible on application of pressure.

Alternatively the core can comprise a longitudinally corrugated thin walled tube (e.g. 0.010" wall thickness) or a core of wire gauze can be longitudinally corrugated to improve its radial contractability.

Cores made of wire gauze can be externally coated with refractory oxide such as beryllia, in order to present a smooth outer surface and thereby enable the production of a smooth bored tube. Other coatings can be applied with the object of improving compatibility and/or contamination problems which may arise between the core and the material being sintered.

Figure 1:
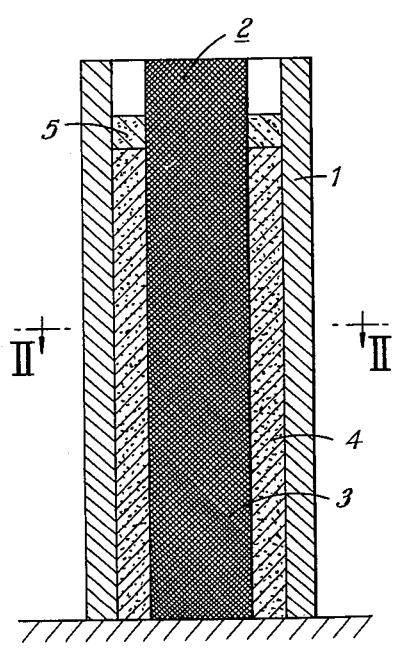
Figure 3:
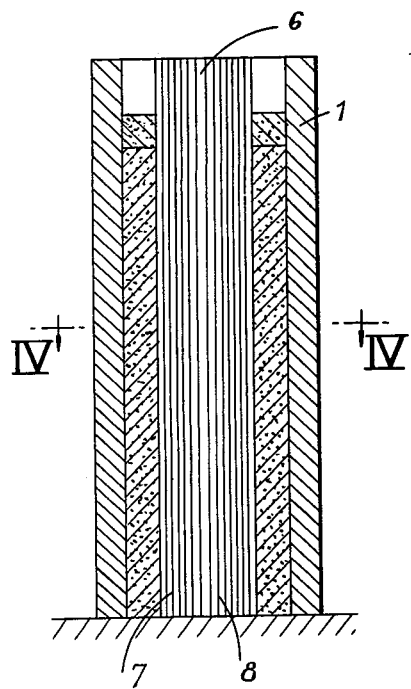

The invention will now be described by way of examples with reference to the accompanying drawings in which:

FIGS. 1 and 3 are longitudinal sectional elevations.

Figure 2:
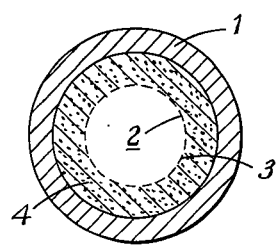
Figure 4:
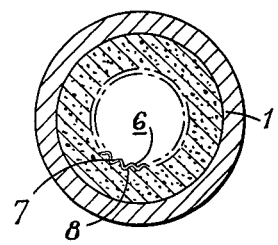

FIGS. 2 and 4 respectively are sections along the lines II—II and IV—IV in FIGS. 1 and 4.

Referring to FIGS. 1 and 2 there is shown a cylindrical graphite mold 1 surrounding a central core 2 which takes the form of a sleeve of wire mesh 3. The fire mesh 3 is of diamond shaped weave so that the core 2 is of radially contractable nature. The mold 1, which is previously heated in vacuo to remove any tarry material, is filled with metal powder 4 about the core 2 and the powder is shaken down either by tapping the mold 1 or by placing the mold 1 on a vibrating platform. Sintering of the metal powder 4 is now effected in a vacuum furnace with the surface of the powder 4 covered with a layer of refractory oxide 5 to minimize volatilization of the metal. Considerable shrinkage occurs during sintering and this is accommodated by the contractability of the core 2.

In FIGS. 3 and 4 there is shown a graphite mold 1 containing a core 6 in the form of a thin walled metal tube 7 having longitudinal corrugations 8. The longitudinal corrugations 8 ensure that the tube 7 can contract radially to accommodate shrinkage during sintering. Cores of wire mesh may also be longitudinally corrugated if it is found that the contractability of a plain sleeve is insufficient to accommodate shrinkage of the sinter.

The invention has an important application in the manufacture of beryllium tubes, beryllium being a metal which is expensive and not readily worked by conventional processes. The current practice for the formation of beryllium tubes is to make a solid bar and then machine the bar into a tube. This results in poor utilization of the metal as a considerable amount of swarf has to be recycled. Typically to manufacture a beryllium tube of inside diameter 2" and outside diameter 3" a graphite mold of 3.7" inside diameter is used and a collapsible core of 2.46" diameter, the temperature of sintering being 1200° C.

Cores made of wire gauze may be coated with a colloidal solution of graphite which can be either air or furnace dried. This produces a smooth outer surface which can be further coated with refractory oxide (BeO) and thereby enable the production of a smooth bored tube.

I claim:

1. A mold for producing non-porous sintered tubular bodies from powdered materials, comprising; an outer mold; and a tubular yieldable core means disposed within the mold to define an annular space therewith for the powdered material and to yield radially inwardly under shrinking forces occurring during the sintering operation while providing support to the material throughout the operation, said core means being made of metal which is indestructible at sintering temperatures.

2. A mold according to claim 1 wherein the core member comprises a sleeve of wire mesh.

3. A method of producing a dense non-porous hollow body from powder, comprising; the steps of filling a mold with loose powder about a yieldable supporting core, and heating said loose powder to sinter it to a dense non-porous body, while providing continuous yielding internal support from said core throughout the sintering process.

4. A mold for producing non-porous sintered tubular bodies from powdered materials, comprising: an outer mold; and a tubular yieldable core means disposed within the mold to define an annular space therewith for the powdered material and to yield radially inwardly under shrinking forces occurring during the sintering operation while providing support to the material throughout the operation, said core member comprising a sleeve of wire mesh, and said sleeve of wire mesh being coated externally with a refractory oxide so as to present a smooth outer surface.

5. A mold for producing non-porous sintered tubular bodies from powdered materials, comprising: an outer mold; and a tubular yieldable core means disposed within the mold to define an annular space therewith for the powdered material and to yield radially inwardly under shrinking forces occurring during the sintering operation while providing support to the material throughout the operation, said core member comprising a sleeve of wire mesh, said sleeve of wire mesh being longitudinally corrugated to improve its radial contractability.

6. A mold for producing non-porous sintered tubular bodies from powdered materials, comprising: an outer mold; and a tubular yieldable core means disposed within the mold to define an annular space therewith for the powdered material and to yield radially inwardly under shrinking forces occurring during the sintering operation while providing support to the material throughout the operation, said core member comprising a longitudinally corrugated thin-walled tube.

References Cited in the file of this patent

UNITED STATES PATENTS

| | | |
|---|---|---|
| 771,594 | Wilhelmi | Oct. 4, 1904 |
| 1,343,191 | Allcutt | June 15, 1920 |
| 2,227,308 | Hildabolt | Dec. 31, 1940 |
| 2,765,511 | Greene | Oct. 9, 1956 |